Figure 1:
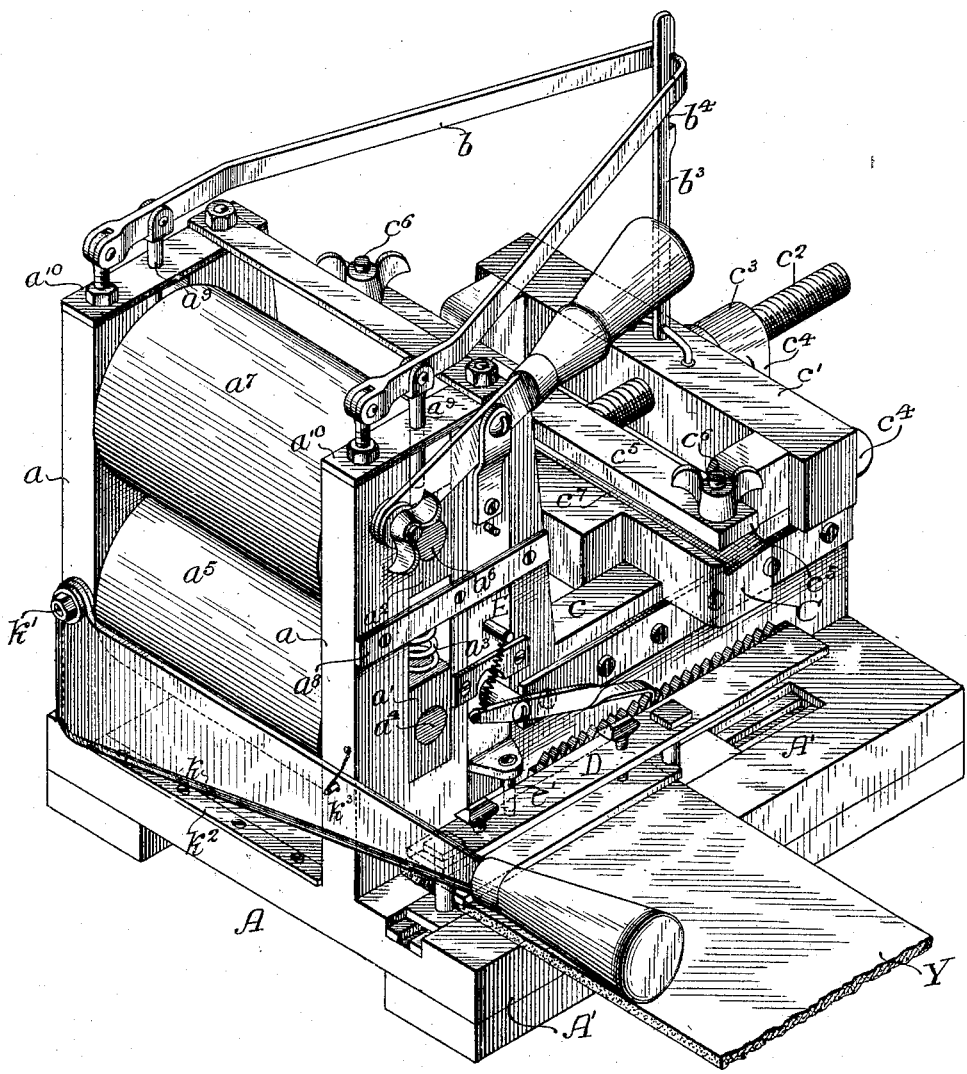

E. TOOLE.
BELT LACING MACHINE.
APPLICATION FILED DEC. 10, 1907.

983,520.

Patented Feb. 7, 1911.

3 SHEETS—SHEET 1.

Witnesses:
Titus M. Irons
Augustus B. Coppes

Inventor
Edward Toole.
by his Attorneys,
Howson & Howson

E. TOOLE.
BELT LACING MACHINE.
APPLICATION FILED DEC. 10, 1907.
983,520.
Patented Feb. 7, 1911.
3 SHEETS—SHEET 2.
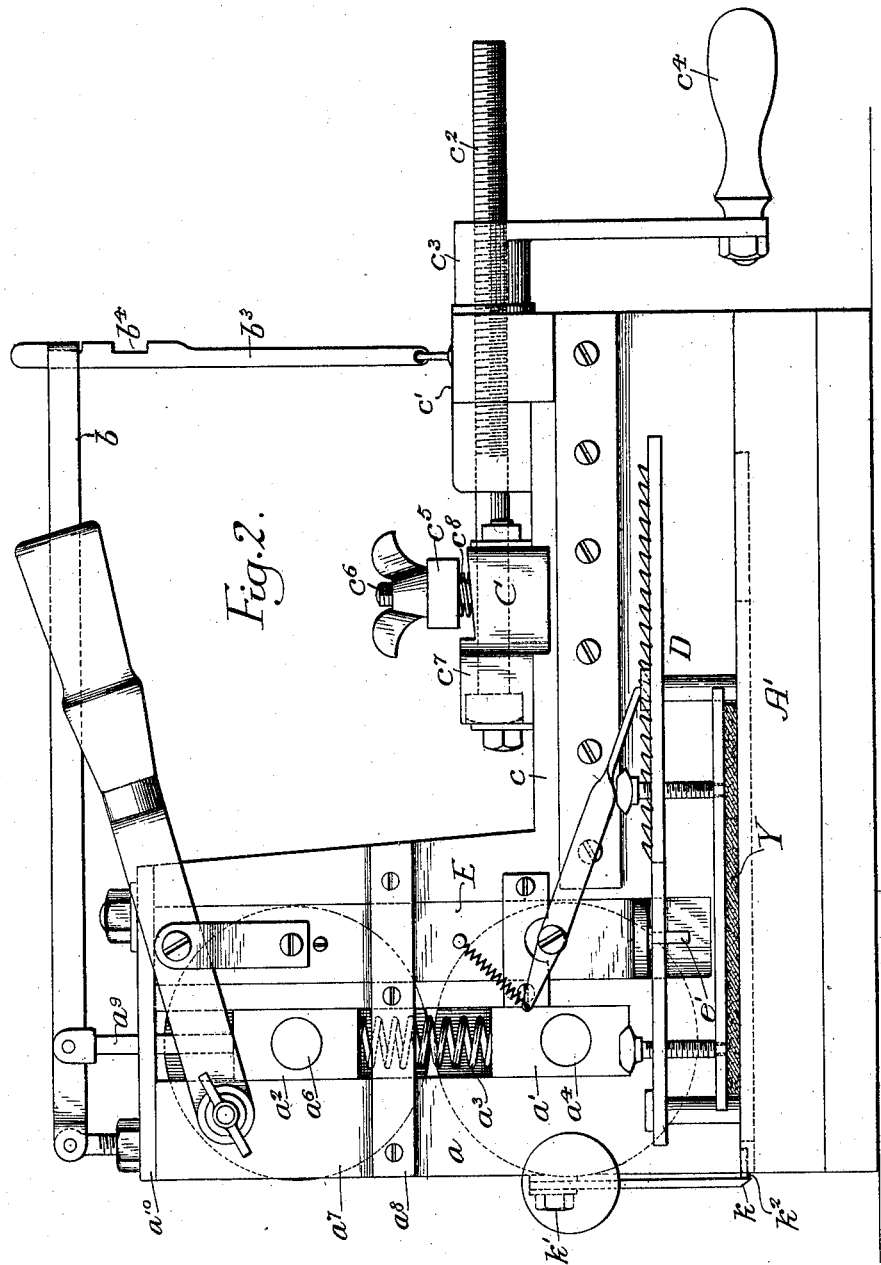

E. TOOLE.
BELT LACING MACHINE.
APPLICATION FILED DEC. 10, 1907.
983,520.
Patented Feb. 7, 1911.
3 SHEETS—SHEET 3.
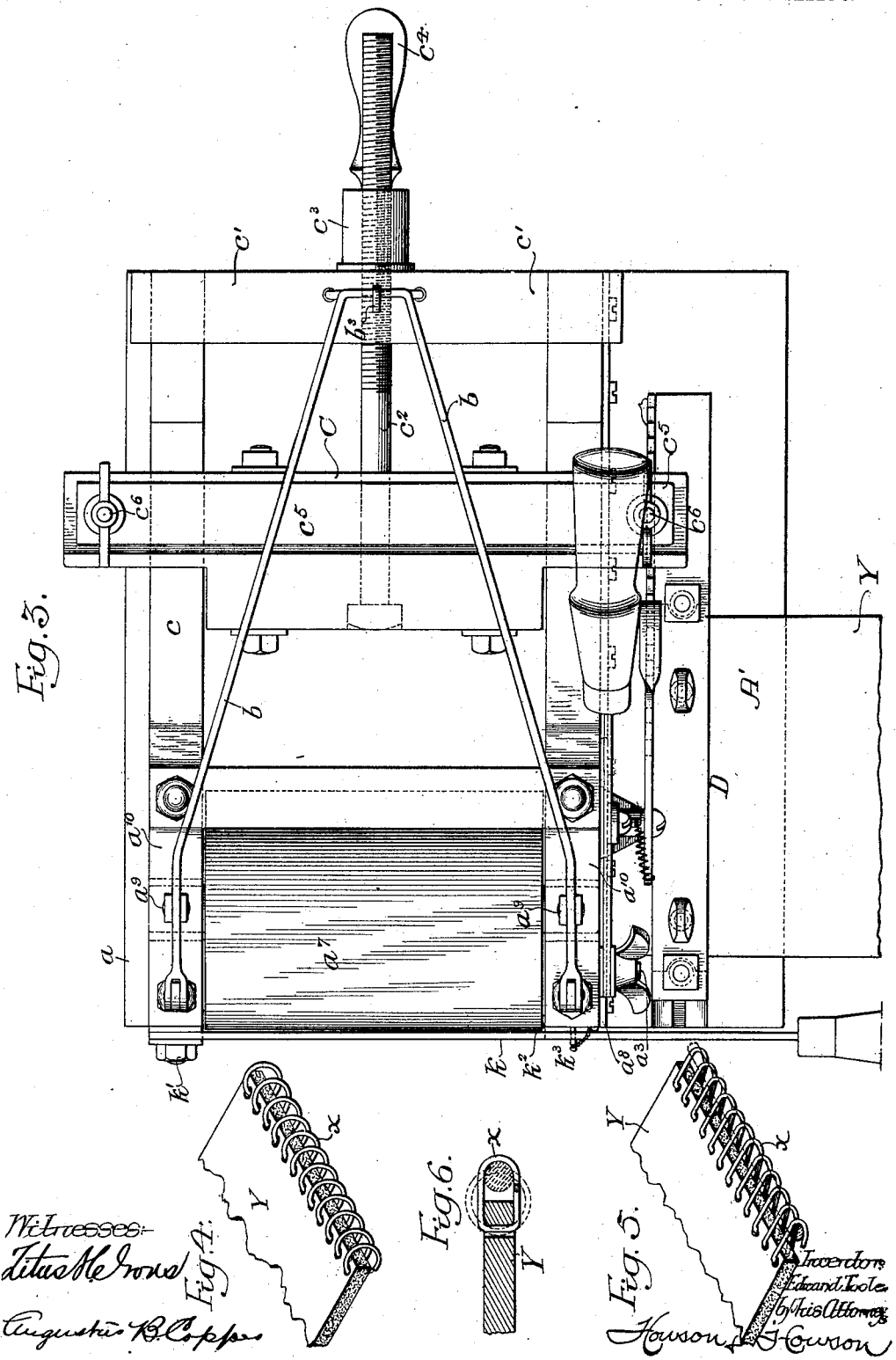

UNITED STATES PATENT OFFICE.

EDWARD TOOLE, OF PHILADELPHIA, PENNSYLVANIA, ASSIGNOR OF ONE-HALF TO WILLIAM W. RUSSELL, OF DEVON, PENNSYLVANIA.

BELT-LACING MACHINE.

983,520.  Specification of Letters Patent.  Patented Feb. 7, 1911.

Application filed December 10, 1907. Serial No. 405,886.

*To all whom it may concern:*

Be it known that I, EDWARD TOOLE, a citizen of the United States, residing in Philadelphia, Pennsylvania, have invented certain Improvements in Belt-Lacing Machines, of which the following is a specification.

One object of my invention is to provide a machine which in addition to preparing a belt for the reception of a helical wire lacing shall also be capable of forming such lacing into shape for use after its insertion in the belt.

Another object of the invention is to provide a relatively simple and conveniently operated machine for so bending a helical wire lacing after it has been placed within a series of holes punched in the end of a belt that it shall be in proper shape for connection with a similarly formed lacing in the other end of the said belt.

Another object of the invention is to provide a machine for simultaneously and uniformly flattening the coils of a helical wire after it has been placed in the holes formed in one end of a leather belt.

These objects and other advantageous ends I secure as hereinafter set forth, reference being had to the accompanying drawings, in which:—

Figure 1 is a perspective view of my machine, illustrating the relative arrangements of its various parts; Fig. 2 is a side elevation of the machine shown in Fig. 1; Fig. 3 is a plan of the machine; Figs. 4 and 5 are perspective views respectively illustrating the end of a belt before and after the helical wire lacing therein has been acted upon by the rolls of the machine, and Fig. 6 is a vertical section of the end of the belt illustrated in Figs. 4 and 5.

In the above drawings, A represents the supporting base of the machine upon which are mounted two upwardly projecting standards $a$, and which extends sidewise beyond one of said standards as indicated at A'. Each standard is vertically slotted for the reception of a pair of bearings $a'$ and $a^2$ and in each instance there is placed between the bearings of each standard a helical spring $a^3$. Mounted in the bearings $a'$ is a spindle $a^4$ carrying a roll $a^5$ and mounted in the bearings $a^2$ is a second spindle $a^6$ carrying a roll $a^7$; these two rolls constituting rotary abutments for crushing down or flattening the convolutions of the helical wire lacing when this is drawn between them. In order to strengthen each standard $a$ a brace or tie-bar $a^8$ extends horizontally between its two portions formed by the slot for the bearings. The springs $a^3$ are so designed as to maintain the spindle $a^6$ with its roll $a^7$, as far away from the roll $a^5$ as is permitted by a pair of rods $a^9$ which pass through a bar or plate $a^{10}$ at the top of each standard and engage the bearings $a^2$.

To each standard I pivot one end of a V-shaped lever $b$ and connect each branch of this to one of the rods $a^9$. This lever extends rearwardly over the machine and is adjustably engaged by a bar $b^3$ movably connected to the base structure of the machine and provided with a series of notches $b^4$, any one of which may be made to engage the rear end of said lever. This bar is retained in engagement with the lever owing to the upward pressure transmitted to this latter through the rods $a^9$ from the springs $a^3$.

The lower portions of the brackets $a$ are extended rearwardly upon the base structure A to form a pair of guides or tracks $c$ and are connected at their extreme rear ends by a transverse bar $c'$ through the center of which extends a horizontally placed hole.

A clamp C designed to grip the leather belt, extends across the two guides or tracks $c$ so as to be free to slide upon them and has fixed to it a bolt $c^2$ extending through the hole of the member $c'$ and threaded for the reception of a nut $c^3$ to which is attached a crank handle $c^4$ whereby the clamp may be forcibly drawn toward the rear of the machine. This clamp has its top surface at substantially the level of the top of the roll $a^5$, and has a transverse clamping bar $c^5$, through the ends of which pass bolts $c^6$, fastened in the ends of the body of said clamp and provided with wing nuts.

The body of the clamp is provided with a shouldered portion $c^7$, so that when the clamping bar $c^5$ is forced down by its wing nuts, the belt is bent to a small extent over the sharp edge of this shoulder in such manner that it is more firmly held by said clamp.

Springs $c^8$ are preferably placed between the body of the clamp and the bar $c^5$ as shown in Fig. 2 so that said bar is held in contact with the wing nuts on the bolts $c^6$ as said nuts are unscrewed, thereby facilitating the insertion and removal of a belt in the clamp.

Upon the projecting side portion A' of the frame of the machine I mount a longitudinally movable carriage D and above it on the adjacent standard $a$ I place a slide E carrying a punch $e'$, together with connecting mechanism whereby the punch may be operated to form a series of uniformly spaced holes in the end of a belt clamped to said carriage. After the belt has been punched it is then passed between the body and the bar $c^5$ of the clamp C and thence forwardly between the two rolls $a^5$ and $a^7$, after which a helical wire $x$ is threaded through the holes in that end of the belt Y which projects through and in front of said rolls, it being understood that the pitch of convolutions of said wire is equal to the distance between two adjacent holes. After the clamping bar $c^5$ has been caused to tightly grip the belt by properly screwing down the nuts on the screws $c^6$, the handle $c^4$ is turned so as to slowly draw the clamp C and with it the end of the belt, toward the end of the machine. As a consequence, the convolutions of the wire $x$ shown in Fig. 4 are first forced toward the forward sides of the holes in the end of the belt, and are then mashed out or flattened into the shape indicated in Figs. 5 and 6 so as to be in condition to be coupled to its other similarly provided end when the two sets of flattened convolutions of the wire have been alternated or intermeshed with each other and a rawhide or other pin has been passed through them.

It will be understood that the upper roll $a^7$ is set at a proper distance from the lower roll as determined by the position of the lever $b$, the notched bar $b^3$ serving to hold said bar and the bearings $a^2$ with said roll in any given position in order to properly flatten the wire lacing.

To suit the machine for operating on the lacing of thick belts, the end of the lever $b$ may be placed in a different one of the notches or recesses $b^4$ of the bar $b^3$, though it is obvious that if desired other means may be provided for adjusting the position of the bearings $a^2$.

In the preferred form of my machine I pivot a knife $k$ to one of the standards $a$ at $k'$ and set a steel blade $k^2$ in the frame A in position to coöperate with it. Any desired means, as a pin $k^3$, may be used to keep the knife elevated when not in use, it being obvious that by proper manipulation the latter may be employed to suitably square the end of a belt prior to the formation in it of the punch holes for the wire lacing.

I claim:

1. The combination of a frame, two rolls having uninterrupted cylindrical surfaces and mounted in said frame so as to be spaced apart, and means for presenting a helical coil of wire sidewise to said rolls, the same including a movable clamp having elongated members for holding the belt, and means for forcibly drawing said clamp away from the rolls to cause a belt carrying such coil and held by said clamp to draw the convolutions of the coil simultaneously between the rolls.

2. The combination of a frame, two cylindrical rolls mounted therein, with means for presenting a helical coil of wire sidewise to said rolls, the same including a carriage having longitudinally extending clamping members parallel with said rolls, and means for moving said carriage to draw a belt attached to it between the rolls and cause the latter to simultaneously engage and uniformly flatten the convolutions of the coil of wire in said belt.

3. The combination of a frame, two flattening abutments mounted in the frame at a predetermined distance apart, a clamp capable of gripping a belt, a screw connected to said clamp, and means operative on said screw for forcibly moving the clamp away from said two abutments so as to forcibly draw between them the belt held by the clamp.

4. The combination of a frame having a guideway, a carriage mounted thereon, means for clamping a belt to said carriage, a screw connected to the carriage and passing through a portion of the frame, a handled nut operative on the screw, and a pair of rolls mounted in the frame.

5. The combination of a frame having a pair of slotted standards, two bearings in each standard, two spindles carried by said bearings, a roll on each spindle, a lever fulcrumed on each standard and connected to one of the bearings thereof, means for holding said lever to maintain said rolls at a definite distance apart, and a device for forcibly drawing a belt between said rolls.

6. The combination of a frame having a pair of slotted standards, two bearings in each standard, two spindles carried by said bearings, a roll on each spindle, a lever fulcrumed on each standard and connected to one of the bearings thereof, means for holding said lever in any of a number of positions to maintain said rolls at a definite distance apart, and a device for forcibly drawing a belt between said rolls.

7. The combination of a frame, two abutments mounted therein, one of said abutments being movable, rods connected to said movable abutment, a lever fulcrumed on the frame and connected to each of said rods, and a notched piece connected to the frame so as to be capable of engaging said lever to maintain it in any of a number of adjusted positions.

8. The combination of a frame, two rolls mounted therein, one of said rolls having movable bearings, rods connected to said movable bearings, a lever fulcrumed on the frame and connected to each of said rods, and a notched piece connected to the frame so as to be capable of engaging said lever to maintain it in any of a number of adjusted positions.

9. The combination of a frame having a pair of cylindrical rolls, means for presenting a helical wire lacing sidewise to the rolls and drawing it between the same, said means including a carriage having a longitudinally extending clamping bar parallel with the rolls, and a projecting shoulder adjacent to and parallel with said clamping bar.

10. The combination of a frame having mounted upon it a pair of rolls, and means for presenting a coil of wire sidewise to the rolls and drawing the same between the latter, said means including a clamp for the belt consisting of a body portion, with a bar extending substantially parallel to the axis of the rolls, said body portion being provided with a shoulder adjacent to the clamping bar, and means for forcibly moving said clamp away from the rolls.

In testimony whereof, I have signed my name to this specification, in the presence of two subscribing witnesses.

EDWARD TOOLE.

Witnesses:
WILLIAM E. BRADLEY,
JOS. H. KLEIN.